(12) United States Patent
Huang et al.

(10) Patent No.: US 12,381,198 B2
(45) Date of Patent: Aug. 5, 2025

(54) SYSTEM FOR PREPARING ELECTRODE HAVING HIGH CYCLE EFFICIENCY, METHOD FOR PREPARING ELECTRODE HAVING HIGH CYCLE EFFICIENCY, AND APPLICATION THEREOF

(71) Applicant: BEIJING WEILION NEW ENERGY TECHNOLOGY CO., LTD., Beijing (CN)

(72) Inventors: Jie Huang, Beijing (CN); Wenjun Li, Beijing (CN); Hong Li, Beijing (CN); Huigen Yu, Beijing (CN)

(73) Assignee: Beijing Weilion New Energy Technology Co., LTD, Beijing (CN)

( * ) Notice: Subject to any disclaimer, the term of this patent is extended or adjusted under 35 U.S.C. 154(b) by 1106 days.

(21) Appl. No.: 17/297,928

(22) PCT Filed: Nov. 27, 2019

(86) PCT No.: PCT/CN2019/121116
§ 371 (c)(1),
(2) Date: May 27, 2021

(87) PCT Pub. No.: WO2020/108503
PCT Pub. Date: Jun. 4, 2020

(65) Prior Publication Data
US 2022/0020975 A1  Jan. 20, 2022

(30) Foreign Application Priority Data

Nov. 27, 2018 (CN) .......................... 201811427687.1
Nov. 27, 2018 (CN) .......................... 201811427688.6
Nov. 27, 2018 (CN) .......................... 201821972810.3

(51) Int. Cl.
*H01M 4/04* (2006.01)
*H01M 4/139* (2010.01)
(Continued)

(52) U.S. Cl.
CPC ......... *H01M 4/0435* (2013.01); *H01M 4/139* (2013.01); *H01M 4/364* (2013.01);
(Continued)

(58) Field of Classification Search
CPC ........... H01M 10/0404; H01M 10/052; H01M 4/0409; H01M 4/0435; H01M 4/139;
(Continued)

(56) References Cited

U.S. PATENT DOCUMENTS

2005/0130043 A1    6/2005  Gao et al.
2015/0318570 A1*  11/2015  Choi .................... H01M 50/429
                                                              429/303
(Continued)

FOREIGN PATENT DOCUMENTS

CN    1830110 A    9/2006
CN    1957489 A    5/2007
(Continued)

OTHER PUBLICATIONS

Japanese Patent Office, First Office Action for Corresponding Patent Application No. 2021-530291 mailed May 23, 2022.
(Continued)

*Primary Examiner* — Lingwen R Zeng
(74) *Attorney, Agent, or Firm* — Honigman LLP; Matthew H. Szalach (57) ABSTRACT

A system used to supplement an electrode with lithium or sodium, includes an electrode treatment unit including metal source-unwinding shafts (1, 3), an electrode-unwinding shaft (2), and press roller devices (7, 8) configured to allow physically adhesive contact of the electrode with the metal source, so that the electrode (5) is supplemented with the metal from metal sources (4, 6); a temperature control treatment device (20*a*) configured to improve the quality and uniformity of metal supplement; and a stripping unit con-
(Continued)

figured to peel off the metal source that has been rolled by the press roller devices (7, 8), wherein the metal sources (4, 6) are a ribbon-shaped lithium source or a ribbon-shaped sodium source. This system and the method using the system can produce an electrode having high cycle efficiency.

11 Claims, 2 Drawing Sheets

(51) Int. Cl.
- *H01M 4/36* (2006.01)
- *H01M 4/38* (2006.01)
- *H01M 10/04* (2006.01)
- *H01M 10/052* (2010.01)

(52) U.S. Cl.
CPC ............ *H01M 4/381* (2013.01); *H01M 4/382* (2013.01); *H01M 10/0404* (2013.01); *H01M 10/052* (2013.01); *Y02E 60/10* (2013.01); *Y02P 70/50* (2015.11)

(58) Field of Classification Search
CPC ...... H01M 4/364; H01M 4/381; H01M 4/382; Y02E 60/10; Y02P 70/50
See application file for complete search history.

(56) References Cited

U.S. PATENT DOCUMENTS

| | | |
|---|---|---|
| 2017/0200937 A1 | 7/2017 | Li et al. |
| 2019/0393509 A1* | 12/2019 | Lee .................. H01M 4/13 |

FOREIGN PATENT DOCUMENTS

| | | |
|---|---|---|
| CN | 102779975 A | 11/2012 |
| CN | 202888313 U | 4/2013 |
| CN | 203415654 U | 1/2014 |
| CN | 203466256 U | 3/2014 |
| CN | 204966620 U | 1/2016 |
| CN | 105489846 A | 4/2016 |
| CN | 105702943 A | 6/2016 |
| CN | 206317512 U | 7/2017 |
| CN | 107240715 A | 10/2017 |
| CN | 107658428 A | 2/2018 |
| CN | 108493439 A | 9/2018 |
| CN | 209150222 U | 7/2019 |
| JP | 2008019458 A | 1/2008 |
| JP | 2013089452 A | 5/2013 |
| JP | 2018142528 A | 9/2018 |
| WO | WO-2013187176 A1 | 12/2013 |

OTHER PUBLICATIONS

European Patent Office, Extended European Search Report for Corresponding Patent Application No. 19889643.3 mailed Dec. 3, 2021.

International Search Report for Application No. PCT/CN2019/121116 dated Mar. 6, 2020.

"Prelithiated Silicon Nanowires as an Anode for Lithium Ion Batteries", Authors: Nian Liu; Liangbing Hu; Matthew T. McDowell; Ariel Jackson and Yi Cui; Department of Chemistry and Department of Materials Science and Engineering, Stanford University (7 pages), accepted Jun. 28, 2011.

* cited by examiner

SYSTEM FOR PREPARING ELECTRODE HAVING HIGH CYCLE EFFICIENCY, METHOD FOR PREPARING ELECTRODE HAVING HIGH CYCLE EFFICIENCY, AND APPLICATION THEREOF

This application is the national phase of International Application No. PCT/CN2019/121116, titled "SYSTEM FOR PREPARING ELECTRODE HAVING HIGH CYCLE EFFICIENCY, METHOD FOR PREPARING ELECTRODE HAVING HIGH CYCLE EFFICIENCY AND APPLICATION THEREOF", filed on Nov. 27, 2019, which claims the priority to Chinese Patent Application No. 201811427688.6, titled "METHOD FOR PREPARING ELECTRODE HAVING HIGH CYCLE EFFICIENCY AND APPLICATION THEREOF", filed on Nov. 27, 2018 with the China National Intellectual Property Administration, the priority to Chinese Patent Application No. 201811427687.1, titled "SYSTEM FOR PREPARING ELECTRODE HAVING HIGH CYCLE EFFICIENCY", filed on Nov. 27, 2018 with the China National Intellectual Property Administration, and the priority to Chinese Utility Model application No. 201821972810.3, titled "SYSTEM FOR PREPARING ELECTRODE HAVING HIGH CYCLE EFFICIENCY", filed on Nov. 27, 2018 with the China National Intellectual Property Administration, which are incorporated herein by reference in entirety.

FIELD

The present disclosure belongs to the technical field of pole sheets, and specifically related to a system for manufacturing an electrode having high cycle efficiency, a method for manufacturing an electrode having high cycle efficiency and application thereof.

BACKGROUND

Silicon has a large theoretical specific capacity when used as a negative electrode material for lithium-ion batteries, which is much larger than that of graphite materials. The development of silicon-based negative electrode materials is of great significance for increasing the energy density of lithium-ion batteries. However, the elemental silicon undergoes serious volume expansion after storing lithium, causing the coating on the silicon negative electrode to become powders and shed off from the current collector, and resulting in a very poor cycle life, and thus it is of no practical value. When silicon-oxygen materials are used as negative electrode materials for lithium-ion batteries, the problem of volume expansion after storing lithium may be greatly improved, but the first efficiency of silicon-oxygen materials is only about 70%, much lower than that of the graphite materials (about 90%). In order to improve the problem of low first efficiency, supplementing metallic lithium on the silicon-oxygen negative electrode has been widely recognized as one solution. As regards the method of realizing supplementing lithium on a negative electrode, experts at home and abroad have carried out a lot of researches and practice, and proposed several common methods as follows.

The Chinese Patent with a Publication No. CN102779975A discloses that a feeding tank to store lithium powder is arranged above the negative electrode of lithium to be supplemented to implement supplementation of lithium, during which the lithium powder is adsorbed on the surface of the negative electrode piece under the action of an electric field and then roller pressed to cause the lithium powder to adhere firmly on the surface of the negative electrode piece to achieve supplementation of lithium. This method may achieve uniformly supplementation of lithium on the electrode surface, provided that the lithium powder has small-sized and uniform particles, the press roller has a surface with very high flatness, and the lithium powder should be adhered as little as possible to the press roller.

The Chinese Patent with a Publication No. CN105489846A discloses that a composite lithium ribbon and an electrode of lithium to be supplemented are press rolled to adhere the lithium ribbon to the electrode of lithium to be supplemented to form a lithium supplemented electrode, and it was stripped and wound up as a first substrate of the composite lithium ribbon. The prerequisite for the practical application of this method is to obtain an ultra-thin lithium ribbon (with a thickness commonly less than 10 μm), and the press roller should has a surface with extremely high flatness (to avoid unevenness).

The Chinese Patent with a Publication No. CN105702943A discloses that the mixed powder of a negative electrode material and a conductive agent is firstly prepared, the mixed powder is put into a conductive material groove, an electrolytic solution is added dropwise to the mixed powder to wet it, the mixed powder added with the electrolytic solution is compacted by using a stainless steel gasket, a separator is placed on the stainless steel gasket, a gasket is arranged on the separator, an lithium sheet is arranged on the gasket, all the parts are sealed together through a device, and then formation on the sealed device is performed by using a battery test system, to realize pre-insertion of lithium into a negative electrode material.

The Chinese Patent with a Publication No. CN204966620U discloses that a lithium supply device and a negative electrode of lithium to be supplemented is kept in contact and soaked in an electrolytic solution together. Since the lithium supply device and the negative electrode of lithium to be supplemented are in contact, there is an electronic channel. Also since the two are soaked in an electrolytic solution together, there is also an ion channel between the two. The mechanism of supplementing lithium is equivalent to a half-cell with an internal short circuit, and lithium ions are extracted from the lithium supply device and reduced after obtaining electrons at the negative electrode of lithium to be supplemented, so that supplement of lithium is realized.

The above devices for manufacturing lithium pole piece are relatively complicated, and the prepared pole piece has poor cycle efficiency.

SUMMARY

In view of that, an object of the present disclosure is to provide a system for manufacturing an electrode having high cycle efficiency, a method for manufacturing an electrode having high cycle efficiency and application thereof. This system is sample, and the full battery manufactured by using the electrode prepared by it has higher cycle efficiency.

The present disclosure provides a system for manufacturing an electrode having high cycle efficiency comprising: an electrode treatment unit; a temperature control treatment device in serial connection with the electrode treatment unit, which comprises a temperature control vacuum treatment device or a temperature control inert treatment device; and a stripping unit in serial connection with the temperature control treatment device, which separates a first metal source after being press rolled and an electrode of a metal to be supplemented after being press rolled;

The electrode treatment unit comprises an unwinding shaft of the first metal source, for unwinding the first metal source; an unwinding shaft of the electrode of a metal to be supplemented in parallel connection with the unwinding shaft of the first metal source, for unwinding the electrode of a metal to be supplemented; and a press roller device in serial connection with the unwinding shaft of the first metal source and the unwinding shaft of the electrode of a metal to be supplemented, for press rolling the first metal source and the electrode of a metal to be supplemented into a composite electrode.

Preferably, the temperature control vacuum treatment device is a vacuum oven or a vacuum bag.

Preferably, an atmosphere inside the inert treatment device is a $CO_2$ atmosphere or an argon gas atmosphere.

The present disclosure provides a system for manufacturing an electrode having high cycle efficiency, comprising an atmosphere box inside which a vacuum atmosphere or an inert atmosphere or a protective atmosphere or a mixed atmosphere of an inert atmosphere-a protective atmosphere is present;

an electrode treatment unit arranged inside the atmosphere box; a temperature control box in serial connection with the electrode treatment unit; and a stripping unit in serial connection with the temperature control box, which separates a first metal source after being press rolled and an electrode of a metal to be supplemented after being press rolled;

wherein the electrode treatment unit comprises an unwinding shaft of the first metal source, for unwinding the first metal source; an unwinding shaft of the electrode of a metal to be supplemented in parallel connection with the unwinding shaft of the first metal source, for unwinding the electrode of a metal to be supplemented; and a press roller device in serial connection with the unwinding shaft of the first metal source and the unwinding shaft of the electrode of a metal to be supplemented, for press rolling the first metal source and the electrode of a metal to be supplemented into a composite electrode.

Preferably, the system further comprises an unwinding shaft of a second metal source in parallel connection with the unwinding shaft of the first metal source and the unwinding shaft of the electrode of a metal to be supplemented, for unwinding a second metal source;

wherein the unwinding shaft of the first metal source and the unwinding shaft of the second metal source are respectively located at an upper side and a lower side of the unwinding shaft of the electrode of a metal to be supplemented.

Preferably, a metal in the first metal source and the second metal source is selected from lithium or sodium.

Preferably, the electrode of a metal to be supplemented is selected from graphite negative electrode, hard carbon negative electrode, soft carbon negative electrode, mesophase carbon microsphere negative electrode, silicon-carbon negative electrode, silicon-oxygen-carbon negative electrode, silicon negative electrode, silicon-oxygen negative electrode, lithium titanate negative electrode, transition metal oxide negative electrode or sulfur-based positive electrode.

Preferably, the stripping unit is a guide roller shaft.

Preferably, the system further comprises a winding unit in serial connection with the stripping unit, which winds up the first metal source after being stripped and the pole piece after being stripped.

Preferably, the present disclosure provides a method for manufacturing an electrode having high cycle efficiency, comprising the following steps:

roller pressing, flat pressing, gas pressing or liquid pressing a metal source and an electrode of a metal to be supplemented, to achieve physical adhesion contact, and subjecting a temperature control treatment under a vacuum or an inert atmosphere and then stripping the metal source, to obtain an electrode having high cycle efficiency;

wherein the electrode of a metal to be supplemented is selected from a negative electrode capable of transporting metal or a positive electrode capable of transporting metal; and a metal in the metal source is selected from lithium or sodium.

Preferably, the electrode of a metal to be supplemented is selected from graphite negative electrode, hard carbon negative electrode, soft carbon negative electrode, mesophase carbon microsphere negative electrode, silicon-carbon negative electrode, silicon-oxygen-carbon negative electrode, silicon negative electrode, silicon-oxygen negative electrode, lithium titanate negative electrode, transition metal oxide negative electrode or sulfur-based positive electrode.

Preferably, the lithium source is pure metallic lithium, lithium alloy or a lithium composite; and the sodium source is pure metallic sodium, sodium alloy or a sodium composite.

Preferably, the temperature control treatment is performed at a temperature of 0-150° C. for a duration of 0.1-168 h Preferably, the vacuum has a vacuum degree of −10 KPa to −99 KPa.

Preferably, the inert atmosphere is a carbon dioxide atmosphere or an argon atmosphere.

Preferably, the electrode of a metal to be supplemented is sheet-shaped or ribbon-shaped.

Preferably, the metal source and the electrode of a metal to be supplemented is roller pressed, flat pressed, gas pressed or liquid pressed under a vacuum or an inert atmosphere or a protective atmosphere or a mixed atmosphere of an inert atmosphere-a protective atmosphere.

The present disclosure provides use of an electrode having high cycle efficiency manufactured by using the preparation method described in the above technical solution in a battery.

The present disclosure provides a system for manufacturing an electrode having high cycle efficiency, comprising an electrode treatment unit; a temperature control treatment device in serial connection with the electrode treatment unit, which comprises a temperature control vacuum treatment device or a temperature control inert treatment device; and a stripping unit in serial connection with the temperature control treatment device, which separates a first metal source after being press rolled and an electrode of a metal to be supplemented after being press rolled; or comprising an atmosphere box inside which a vacuum atmosphere or an inert atmosphere is present; an electrode treatment unit arranged inside the atmosphere box; a temperature control box in serial connection with the electrode treatment unit; and a stripping unit in serial connection with the temperature control box, which separates the first metal source after being press rolled and the electrode of a metal to be supplemented after being press rolled. In the present disclosure, the composite electrode may be treated in the temperature control vacuum treatment device or the temperature control inert treatment device after press rolled by the press roller device. It may also be treated in an atmosphere box in which a first metal shaft, the unwinding shaft of the electrode of a metal to be supplemented, a press roller device and a temperature control box connected in series behind the press roller device are arranged as a whole, wherein a vacuum atmosphere or an inert atmosphere is present inside the atmosphere box. The system provided by the present disclosure only includes an unwinding device, the press roller device, and the vacuum treatment device or the inert treatment device and the stripping unit. The system is simple, and the electrode produced by it has a higher first cycle efficiency and also a better recursive performance. The experimental results have shown that the full battery produced by using the electrode manufactured by the system provided by the present disclosure has a first cycle efficiency of 85.7-96.5%, and a capacity retention rate of the battery of 90.7-98.3% after 100 cycles.

The method provided by the present disclosure can obtain an electrode having high cycle efficiency only by subjecting the metal source and the electrode to be supplemented to physical adhesion contact, and then performing a temperature control treatment in a vacuum or an inert atmosphere for a certain duration. This method is simple. The electrode having high cycle efficiency has no silver-white metallic lithium visible to human eyes at its surface when the metal source is stripped. In addition, the electrode of a metal to be supplemented has both electronic conductivity and ion conductivity. Therefore, the metal source will undergo a metal embedding process to the electrode of a metal to be supplemented; and a metal diffusion process also occurs during the physical adhesion contact, so that the electrode has a higher first cycle efficiency. The full battery produced by using the electrode manufactured by the method provided by the present disclosure has higher first cycle efficiency and higher capacity retention rate.

DETAILED DESCRIPTION

Hereinafter the technical solutions in the embodiments of the present disclosure will be described clearly and completely. Obviously, the embodiments to be described are only a part of the embodiments of the present disclosure, rather than all of them. Based on these embodiments in the present disclosure, all the other embodiments obtained by a person having ordinary skill in the art without creative labor should fall within the protection scope of the present disclosure.

The present disclosure provides a method for manufacturing an electrode having high cycle efficiency, comprising the following steps:

roller pressing, flat pressing, gas pressing or liquid pressing a metal source and an electrode of a metal to be supplemented, to achieve physical adhesion contact, and then subjecting a temperature control treatment under a vacuum or an inert atmosphere and then stripping the metal source, to obtain an electrode having high cycle efficiency;

wherein the electrode of a metal to be supplemented is selected from a negative electrode capable of transporting metal or a positive electrode capable of transporting metal; and the metal source is selected from a lithium source or a sodium source.

The method provided by the present disclosure preparation is simple, and the manufactured electrode has higher cycle efficiency, high product quality, and low cost, and good application prospects. The full battery manufactured by using the electrode has higher first cycle efficiency and capacity retention rate.

In the present disclosure, a metal in the metal source is selected from lithium or sodium. The metallic element selected for the metal source is consistent with the metallic element in the electrode of a metal to be supplemented, that is, the same metallic element is selected at the same time.

In the present disclosure, the lithium source is pure metallic lithium, lithium alloy or a lithium composite; and the sodium source is pure metallic sodium, sodium alloy or a sodium composite.

In the present disclosure, the metal source may be present in a form of a single active layer, or in a form of a composite layer of a base layer and the active layer. The base layer is selected from a metal layer with ductility or a non-metal layer which is heat resistant and non-reactive with metallic lithium. Specifically, the base layer is selected from copper foil, aluminum foil, stainless steel foil, polyimide, polyaramid, polyester or polytetrafluoroethylene. The overall thickness of the composite layer is consistent with the thickness of the single active layer. There is no special requirement for the thickness of the active layer and the composite layer, as long as it meets the requirement of stripping strength and does not break.

In the present disclosure, the electrode of a metal to be supplemented is selected from a negative electrode capable of transporting metal or a positive electrode capable of transporting metal. The negative electrode capable of transporting metal is a negative electrode capable of embedding metal. The positive electrode capable of transporting metal is a positive electrode capable of embedding metal. The electrode of a metal to be supplemented is preferably selected from graphite negative electrode, hard carbon negative electrode, soft carbon negative electrode, mesophase carbon microsphere negative electrode, silicon-carbon negative electrode, silicon-oxygen-carbon negative electrode, silicon negative electrode, silicon-oxygen negative electrode, lithium titanate negative electrode, transition metal oxide negative electrode or sulfur-based positive electrode. In a specific example of the present disclosure, the electrode of a metal to be supplemented is selected from a pole piece of the silicon-oxygen-carbon composite negative electrode or a pole piece of the sulfur-carbon composite positive electrode with a reversible capacity of 600 mAh/g.

In the present disclosure, the preparation of the electrode is preferably carried out in an atmosphere box, and the atmosphere in the atmosphere box is a vacuum or an inert atmosphere. In the present disclosure, the metal source and the electrode of a metal to be supplemented may be roller pressed, flat pressed, gas pressed or liquid pressed under the vacuum or the inert atmosphere, or roller pressed, flat pressed, gas pressed or liquid pressed first and then perform s temperature control treatment after adjusting the atmosphere of the atmosphere box to a vacuum or an inert atmosphere.

In the present disclosure, the metal source and the electrode of a metal to be supplemented are roller pressed, flat pressed, gas pressed or liquid pressed, to achieve physical adhesion contact. After physical adhesion contact of the metal source and the electrode of a metal to be supplemented, a temperature control treatment under a vacuum or an inert atmosphere is performed, thereby improving the quality and uniformity of supplemented metallic element, as well as the first efficiency and cycle performance of the manufactured electrode. The temperature control treatment is preferably constant temperature treatment. In the present disclosure, the vacuum has a vacuum degree of −10 KPa to −99 KPa. The inert atmosphere is a carbon dioxide atmosphere or an argon atmosphere. In the present disclosure, the temperature control treatment under the vacuum or the inert atmosphere is preferably carried out at a temperature of 0-150° C., and more preferably 20-110° C., and preferably for a duration of 0.1 h-168 h, more preferably for 3 h-72 h. In a specific example of the present disclosure, the treatment under the vacuum or the inert atmosphere is specifically performed by: maintaining at a temperature of 110° C. for 4 h at a vacuum degree of −20 KPa; or maintaining at a temperature of 50° C. for 30 h at a vacuum degree of −80 KPa; or maintaining at room temperature for 2 days under an argon atmosphere; or vacuum packing in a packaging bag with a vacuum degree drawn to −90 KPa and maintaining at a temperature of 80° C. for 10 h in a vacuum oven; or maintaining at a temperature of 55° C. for 8 h in an atmosphere box with a vacuum degree of −70 KPa; or maintaining at a temperature of 0° C. for 8 h in an atmosphere box with a vacuum degree of −95 KPa with fluorine and carbon dioxide atmosphere introduced into at an atmosphere pressure of 1:1.

In the present disclosure, the composite ribbon formed after contacting the metal source and the electrode of a metal to be supplemented may be packed in an aluminum plastic bag or by other vacuum packaging way, and placed in common environment. The treatment under the vacuum atmosphere in the present disclosure may be carried out without heating, and it can be directly stored in a room temperature environment, thereby saving energy consumption. If heating is required during the treatment, it may be heated in a whole roll; and may also be heated in a manner of being wound or unwound, that is, the composite ribbon of the metal source and the electrode of a metal to be supplemented is heated in a manner of being unwound, and then wound up.

In the present disclosure, the electrode of a metal to be supplemented is preferably sheet-shaped or ribbon-shaped.

In the present disclosure, if the metal source is a sodium source, and the electrode of a metal to be supplemented is an electrode of sodium to be supplemented, so that the obtained electrode is sodium battery electrode; and if the metal source is a lithium source, and the electrode of a metal to be supplemented is an electrode of lithium to be supplemented, so that the obtained electrode will be a lithium electrode.

The present disclosure provides use of the electrode having high cycle efficiency manufactured by the preparation method described in the above technical solution in a battery. The battery is a sodium battery or a lithium battery.

In the present disclosure, by subjecting the electrode pole piece and the positive electrode (negative electrode) pole piece described above to processes of stacking, pre-welding, welding, loading in can, liquid-injecting, packaging, shelving, forming, second packaging, cutting-folding-ironing, capacity grading, aging and other processes, a battery is obtained. In the present disclosure, the obtained battery is tested on its first cycle efficiency and cycle performance.

In the present disclosure, the system for manufacturing the electrode having high cycle efficiency described above comprises an electrode treatment unit; a temperature control treatment device in serial connection with the electrode treatment unit, which comprises a temperature control vacuum treatment device or a temperature control inert treatment device; and a stripping unit in serial connection with the temperature control treatment device, which separates a first metal source after being press rolled and an electrode of a metal to be supplemented after being press rolled;

wherein the electrode treatment unit comprises an unwinding shaft of the first metal source, for unwinding the first metal source; an unwinding shaft of the electrode of a metal to be supplemented in parallel connection with the unwinding shaft of the first metal source, for unwinding the electrode of a metal to be supplemented; and a press roller device in serial connection with the unwinding shaft of the first metal source and the unwinding shaft of the electrode of a metal to be supplemented, for press rolling the first metal source and the electrode of a metal to be supplemented into a composite electrode.

Figure 1A:
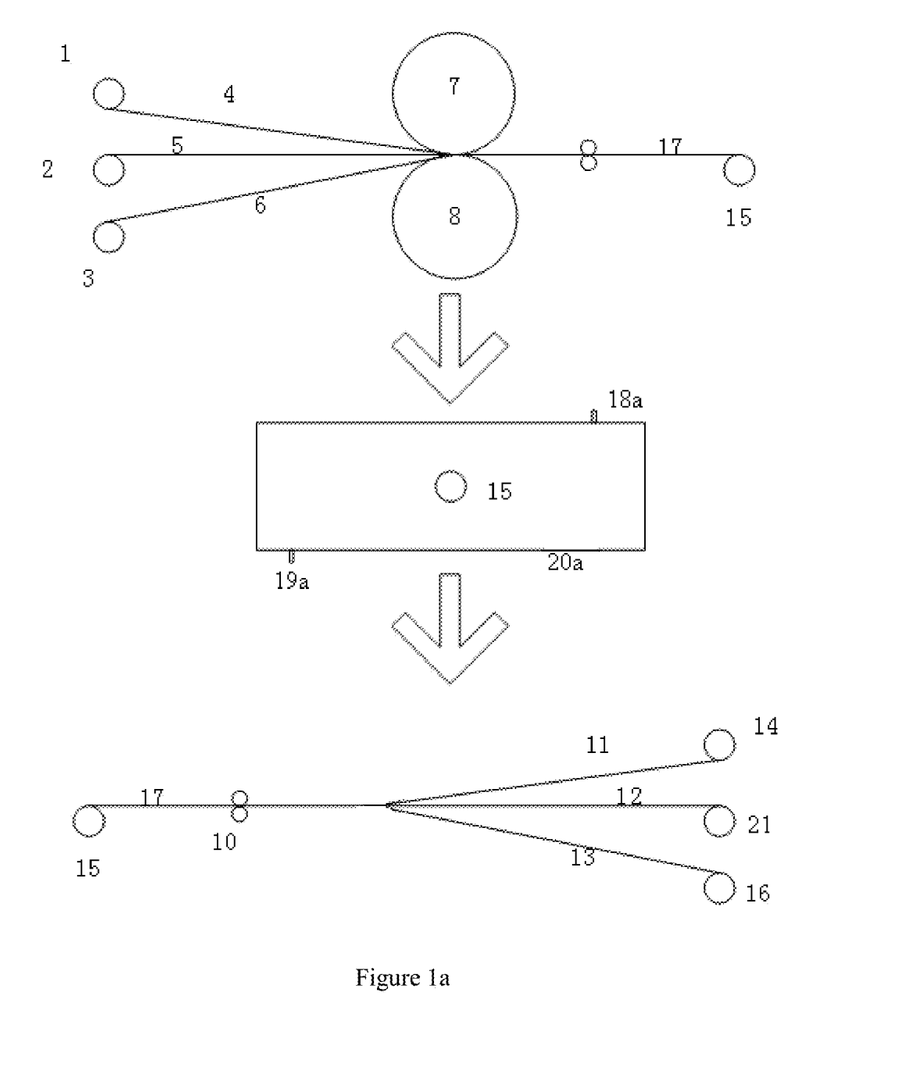
FIG. 1a is a structure diagram of the system for manufacturing an electrode having high cycle efficiency provided by an example of the present disclosure.

Referring to FIG. 1a, FIG. 1a is a structure diagram of the system for manufacturing an electrode having high cycle efficiency provided by an embodiment of the present disclosure, wherein 1 is an unwinding shaft of a first metal source, 2 is an unwinding shaft of an electrode of a metal to be supplemented, 3 is an unwinding shaft of a second metal source, 4 is a first metal source, 5 is an electrode of a metal to be supplemented, 6 is a second metal source, 7 is a first press roller, 8 is a second press roller, 10 is a guide roller shaft, 11 is a first metal source after being stripped, 12 is a pole piece after being stripped, 13 is a second metal source after being stripped, 14 is a winding shaft of the first metal source after being stripped, 15 is a winding shaft of a composite pole piece, 16 is a winding shaft of the second metal source after being stripped, 21 is a winding shaft of the electrode of a metal to be supplemented after being stripped, 17 is a composite electrode, 18a is a gas-outlet valve, 19a is an gas-inlet valve, and 20a is a temperature control treatment device.

The system for manufacturing an electrode having high cycle efficiency provided by the present disclosure includes an electrode treatment unit. The electrode treatment unit includes an unwinding shaft of a first metal source 1, for unwinding a first metal source 4. The first metal source 4 is selected from a lithium source or a sodium source. The metallic element selected for the first metal source is consistent with the metallic element in the electrode of a metal to be supplemented, that is, the same metallic element is selected at the same time.

In the present disclosure, the lithium source is pure metallic lithium, lithium alloy or a lithium composite, and the sodium source is pure metallic sodium, sodium alloy or a sodium composite. In a specific example of the present disclosure, the metal source is a ribbon-shaped lithium-aluminum alloy, ribbon-shaped pure metallic lithium or pure metallic lithium ribbon covered with copper.

In the present disclosure, the first metal source may be present in a form of a single active layer, or in a form of a composite layer of a base layer and the active layer. The base layer is selected from a metal layer with ductility or a non-metal layer which is heat resistant and non-reactive with metallic lithium. Specifically, the base layer is selected from copper foil, aluminum foil, stainless steel foil, polyimide, polyaramid, polyester or polytetrafluoroethylene. The overall thickness of the composite layer is consistent with the thickness of the single active layer. There is no special requirement for the thickness of the active layer and the composite layer, as long as it meets the requirement of stripping strength and does not break.

The electrode treatment unit includes an unwinding shaft of the electrode of a metal to be supplemented 2 in parallel connection with an unwinding shaft of the first metal source, for unwinding the electrode of a metal to be supplemented 5. In the present disclosure, the electrode of a metal to be supplemented 5 is selected from a negative electrode capable of transporting metal or a positive electrode capable of transporting metal. The negative electrode capable of transporting metal is a negative electrode capable of embedding metal. The positive electrode capable of transporting metal is a positive electrode capable of embedding metal. The electrode of a metal to be supplemented is preferably selected from graphite negative electrode, hard carbon negative electrode, soft carbon negative electrode, mesophase carbon microsphere negative electrode, silicon-carbon negative electrode, silicon-oxygen-carbon negative electrode, silicon negative electrode, silicon-oxygen negative electrode, lithium titanate negative electrode, transition metal oxide negative electrode or sulfur-based positive electrode. In a specific example of the present disclosure, the electrode of a metal to be supplemented is selected from a silicon-oxygen-carbon composite negative electrode having a reversible capacity of 600m Ah/g.

The electrode treatment unit includes a press roller device in serial connection with the unwinding shaft of the first metal source and the unwinding shaft of the electrode of a metal to be supplemented, for press rolling the first metal source and the electrode of a metal to be supplemented into a composite electrode 17. The press roller device includes a first press roller 7 and a second press roller 8, which are arranged opposite to each other. The roller press host of the press roller device can accurately sense the pressure and adjust the roller gap. The press roller device allows the first metal source and the electrode of a metal to be supplemented to achieve physical adhesion contact. The composite electrode 17 obtained after press rolling is transported to a winding shaft of a composite pole piece 15 through a guide roller shaft, to wind up the composite electrode.

The system for manufacturing an electrode having high cycle efficiency provided by the present disclosure includes a temperature control treatment device 20*a* in serial connection with the electrode treatment unit. The temperature control treatment device includes a temperature control vacuum treatment device 201 and a temperature control inert treatment device 202. Specifically, the temperature control treatment device is connected with the press roller device in the electrode treatment unit, and the temperature control treatment device is provided with a gas-inlet valve 18*a* and a gas-outlet valve 19*a*. In the present application, the temperature control vacuum treatment device is a vacuum oven or a vacuum bag. The vacuum oven has a function of vacuumizing and controlling temperature. The temperature control inert treatment device is realized by introducing inert gas into the vacuum oven. The inert atmosphere inside the temperature control inert treatment device is a $CO_2$ atmosphere or an argon atmosphere. In the present disclosure, the composite pole piece after being wound up is placed in the temperature control treatment device for processing.

The system for manufacturing an electrode having high cycle efficiency provided by the present disclosure includes a stripping unit in serial connection with the temperature control treatment device, which separates the first metal source after being press rolled and the electrode of a metal to be supplemented after being press rolled. The stripping unit is a guide roller shaft 10. The number of the guide roller shaft is preferably >1. After the composite pole piece passes through the guide roller shaft, the first metal source after being press rolled and the electrode of a metal to be supplemented after being press rolled are stripped.

The system preferably further includes a winding unit in serial connection with the stripping unit, which winds up the first metal source after being stripped 11 and the pole piece after being stripped 12 round a winding shaft of the first metal source after being stripped 14 and a winding shaft of the pole piece after being stripped 21.

If the electrode of a metal to be supplemented need to supplement with metal at both of its surfaces, the system for manufacturing an electrode having high cycle efficiency provided by the present disclosure preferably further includes an unwinding shaft of a second metal source 3 in parallel connection with the unwinding shaft of the first metal source and the unwinding shaft of the electrode of a metal to be supplemented, for unwinding a second metal source 6. The unwinding shaft of the first metal source and the unwinding shaft of the second metal source are respectively located at an upper side and a lower side of the unwinding shaft of the electrode of a metal to be supplemented. Correspondingly, the second metal source after being press rolled is stripped at the stripping unit, and a winding shaft of the second metal source after being stripped 16 should be arranged behind the stripping unit, for winding up a second metal source after being stripped 13.

In the present disclosure, the speeds of winding and unwinding are appropriately adjusted, so that their speeds are matched, and the winding and unwinding can be carried out with tension.

Figure 1B:
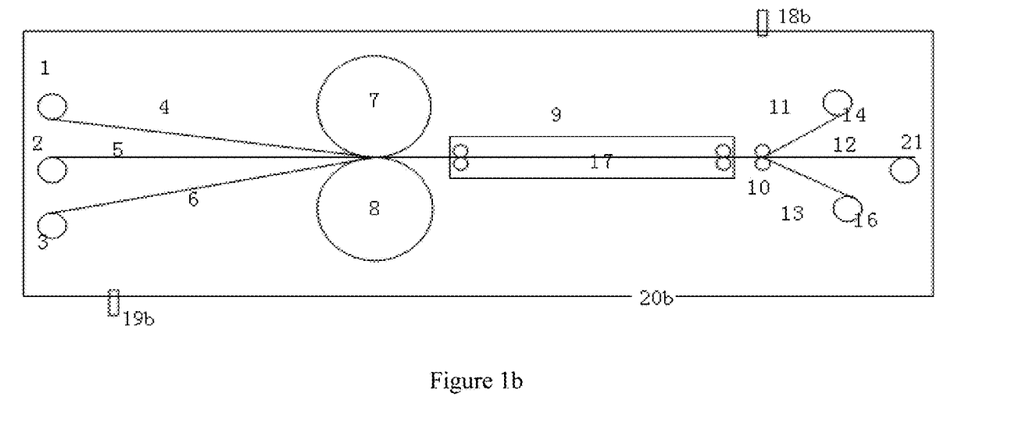
FIG. 1b is a structure diagram of the system for manufacturing an electrode having high cycle efficiency provided by another example of the present disclosure system.

Referring to FIG. 1*b*, FIG. 1*b* is a structure diagram of the system for manufacturing an electrode having high cycle efficiency provided by another example of the present disclosure, wherein 9 is a temperature control box, 20*b* is an atmosphere box, 18*b* is an gas-inlet, and 19*b* is a gas-outlet.

In the present disclosure, the system for manufacturing an electrode having high cycle efficiency, may also be provided as:

the system for manufacturing an electrode having high cycle efficiency includes: an atmosphere box, and inside the atmosphere box a vacuum atmosphere or inert atmosphere is present;

an electrode treatment unit arranged inside the atmosphere box; a temperature control box in serial connection with the electrode treatment unit; and a stripping unit in serial connection with the temperature control box, which separates the first metal source after being press rolled and the electrode of a metal to be supplemented after being press rolled;

wherein the electrode treatment unit includes an unwinding shaft of the first metal source, for unwinding the first metal source; an unwinding shaft of the electrode of a metal to be supplemented in parallel connection with the unwinding shaft of the first metal source, for unwinding the electrode of a metal to be supplemented; and a press roller device in serial connection with the unwinding shaft of the first metal source and the unwinding shaft of the electrode of a metal to be supplemented, for press rolling the first metal source and the electrode of a metal to be supplemented into a composite electrode.

The treatment inside the atmosphere box may be carried out continuously, thereby improving work efficiency and saving energy consumption.

The system provided by the present disclosure includes an atmosphere box 20b, inside of which a vacuum atmosphere or an inert atmosphere or a protective atmosphere or a mixed atmosphere of the inert atmosphere-the protective atmosphere is present. The atmosphere box does not have a temperature control function, and is preferably a cube or cuboid. A gas-inlet 18b and a gas-outlet 19b are arranged at the atmosphere box. The inert atmosphere is selected from a $CO_2$ atmosphere or an argon atmosphere; and the protective atmosphere is selected from a fluorine atmosphere and/or a nitrogen gas atmosphere.

The system for manufacturing an electrode having high cycle efficiency provided by the present disclosure includes an electrode treatment unit arranged inside the atmosphere box, wherein the electrode treatment unit includes an unwinding shaft of a first metal source, for unwinding the first metal source; an unwinding shaft of an electrode of a metal to be supplemented in parallel connection with the unwinding shaft of the first metal source, for unwinding the electrode of a metal to be supplemented; and a press roller device in serial connection with the unwinding shaft of the first metal source and the unwinding shaft of the electrode of a metal to be supplemented, for press rolling the first metal source and the electrode of a metal to be supplemented into a composite electrode. The unwinding shaft of the metal source, the unwinding shaft of the electrode of a metal to be supplemented and the press roller device, which are arranged in the atmosphere box, are the same as in the technical solution described above, so they will not be repeated herein.

In the present disclosure, the treatment unit includes a temperature control box 9 in serial connection with the press roller device. The temperature control box 9 enables the composite electrode to be treated at a desired temperature for a desired duration, and can improve the quality and uniformity of metallic element-supplement, as well as the first efficiency and cycle performance of the manufactured electrode. The temperature control box has a temperature control function, and is preferably a constant temperature box. The composite electrode enters into the temperature control box through a guide roller shaft, and also leaves the temperature control box through the guide roller shaft after the temperature control treatment, and then is stripped.

If the electrode of a metal to be supplemented need to be supplemented with metal at both of its surfaces, the system for manufacturing an electrode having high cycle efficiency provided by the present disclosure preferably further includes an unwinding shaft of a second metal source in parallel connection with the unwinding shaft of the first metal source and the unwinding shaft of the electrode of a metal to be supplemented, for unwinding the second metal source. The unwinding shaft of the first metal source, the unwinding shaft of the electrode of a metal to be supplemented and the unwinding shaft of the second metal source has a corresponded angular velocity.

In order to further describe the present disclosure, the method for manufacturing an electrode having high cycle efficiency and application thereof provided by the present disclosure will be described in detail below in conjunction with examples, but they should not be considered as limiting the protection scope of the present disclosure.

Comparative Example 1

By mixing raw materials, stirring, coating, roller pressing, baking, and die cutting, a pole piece of a silicon-oxygen-carbon (SOC) negative electrode was prepared.

Figure 2:
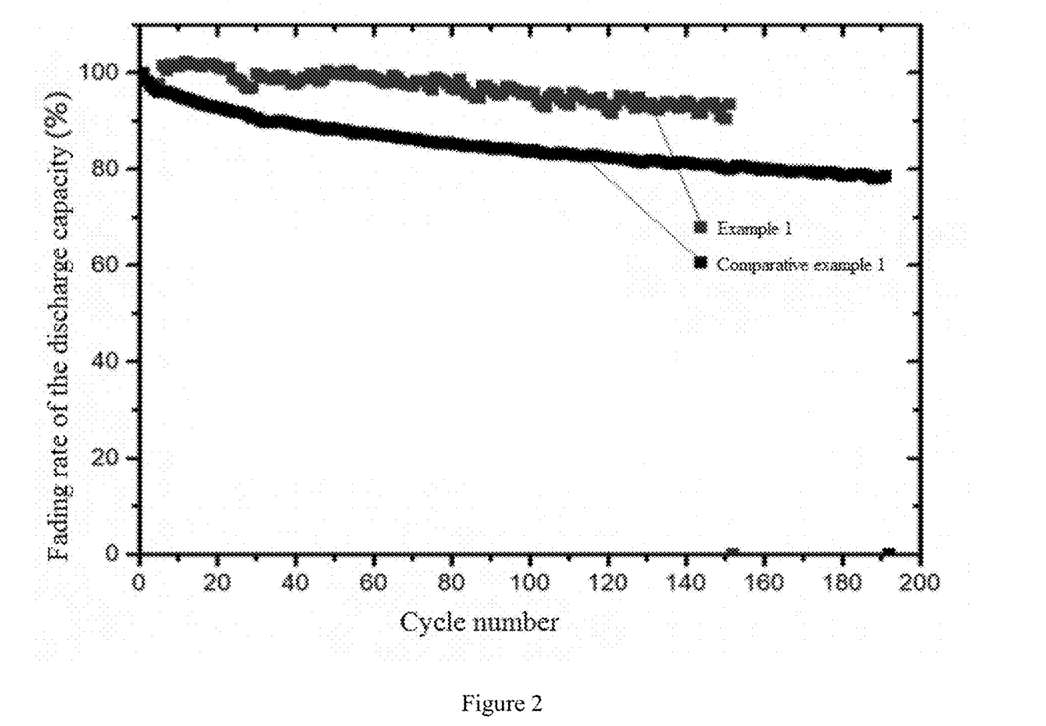
FIG. 2 is a drawing showing the cycle test effect of a lithium battery prepared in Comparative example 1 and Example 1 of the present disclosure.

The ribbon-shaped pole piece of the SOC negative electrode with a reversible capacity of 600 mAh/g and a pole piece of a nickel-cobalt-lithium aluminate (NCA) positive electrode were prepared into a soft pack battery with each unit designed as 42 Ah, through 18 processes including stacking, pre-welding, welding, loading in can, liquid-injecting, packaging, shelving, forming, second packaging, cutting-folding-ironing, capacity grading, and aging. The battery was tested on its first efficiency and cycle. The results are shown in FIG. 2. FIG. 2 is a drawing showing the cycle test of a lithium battery prepared in Comparative example 1 and Example 1 of the present disclosure. It can be seen from FIG. 2 that the cycle of the comparative example continues to fade, and the capacity retention rate of the battery after 100 cycles is 82.1%.

Battery prepared in Comparative example 1 has a first efficiency of 78.2%.

Example 1

By mixing raw materials, stirring, coating, roller pressing, baking, and die cutting, a ribbon-shaped pole piece of a silicon-oxygen-carbon (SOC) negative electrode was obtained.

The ribbon-shaped pure metallic lithium and the ribbon-shaped pole piece of the silicon-oxygen-carbon composite negative electrode with a reversible capacity of 600 mAh/g were roller pressed, combined and directly contacted, to realize a physical adhesion contact. They were maintained at a temperature of 110° C. for 4 h in a vacuum oven with a vacuum degree of −20 KPa, and cooled to ambient temperature with argon gas filled and then taken out. Then, metallic lithium was stripped, to obtain a negative electrode pole piece having high cycle efficiency.

Using the apparatus shown in FIG. 1a, the negative electrode pole piece having high cycle efficiency described above and the pole piece of the NCA positive electrode were prepared into a soft pack battery, with each unit designed as 42 Ah, through 18 processes including stacking, pre-welding, welding, loading in can, liquid-injecting, packaging, shelving, forming, second packaging, cutting-folding-ironing, capacity grading, and aging. The battery was tested on its first efficiency and cycle. The results are shown in FIG. 2. It can be seen from FIG. 2 that there is a slight recovery in capacity during the cycle process of the battery of Example 1, and its discharge capacity almost dose not fade at the first 10 cycles.

The battery prepared in Example 1 has a first efficiency of 91.3%, and the capacity retention rate of the battery after 100 cycles is 95.2%.

Example 2

By mixing raw materials, stirring, coating, roller pressing, baking, and die cutting, a ribbon-shaped pole piece of a silicon-oxygen-carbon (SOC) negative electrode was obtained.

Using the apparatus shown in FIG. 1a, a ribbon-shaped lithium-aluminum alloy and a ribbon-shaped silicon-oxygen-carbon composite negative electrode with a reversible capacity of 600 mAh/g were roller pressed to realize a physical adhesion contact. They were maintained at a temperature of 50° C. for 30 h in a vacuum oven with a vacuum degree of −80 KPa, and cooled to ambient temperature with carbon dioxide filled and then taken out. Then, metallic lithium-aluminum was stripped, to obtain a negative electrode having high cycle efficiency.

The negative electrode having high cycle efficiency described above and a NCA positive electrode were prepared into a soft pack battery, with each unit designed as 42 Ah, through 18 processes including stacking, pre-welding, welding, loading in can, liquid-injecting, packaging, shelving, forming, second packaging, cutting-folding-ironing, capacity grading, and aging. The battery was tested on its first efficiency and cycle.

The battery prepared in Example 2 of the present disclosure has a first efficiency of 89.1%, and the capacity retention rate of the battery after 100 cycles is 93.2%.

Example 3

By mixing raw materials, stirring, coating, roller pressing, baking, and die cutting, a ribbon-shaped pole piece of a silicon-oxygen-carbon (SOC) negative electrode was obtained.

A lithium ribbon was obtained by using PET as base layer, and pure lithium as an active layer.

Using the apparatus shown in FIG. 1a, a lithium ribbon and the ribbon-shaped silicon-oxygen-carbon composite negative electrode with a reversible capacity of 600 mAh/g were roller pressed to realize a physical adhesion contact, and maintained at room temperature for 2 days under argon atmosphere and then taken out. Then, the lithium ribbon was stripped, and die-cut with die-cutting equipment, to obtain a negative electrode pole piece having high cycle efficiency.

The negative electrode pole piece having high cycle efficiency described above and the pole piece of the NCA positive electrode were prepared into a soft pack battery, with each unit designed as 42 Ah, through 18 processes including stacking, pre-welding, welding, loading in can, liquid-injecting, packaging, shelving, forming, second packaging, cutting-folding-ironing, capacity grading, and aging. The battery was tested on its first efficiency and cycle.

The battery prepared in Example 3 of the present disclosure has a first efficiency of 89.4%, and the capacity retention rate of the battery after 100 cycles is 91.1%.

Example 4

By mixing raw materials, stirring, coating, roller pressing, baking, and die cutting, a ribbon-shaped pole piece of a silicon-oxygen-carbon (SOC) negative electrode was obtained.

Using the apparatus shown in FIG. 1a, the ribbon-shaped pole piece of the silicon-oxygen-carbon composite negative electrode with a reversible capacity of 600 mAh/g and a pure metallic lithium ribbon covered with copper were roller pressed to realize a physical adhesion contact, and vacuum packaged in a packaging bag with a vacuum degree drawn to −90 KPa and maintained at a temperature of 80° C. for 10 h in a vacuum oven. Then, they were filled with air and taken out directly and stripped, to obtain a negative electrode pole piece having high cycle efficiency.

The negative electrode pole piece having high cycle efficiency described above and the pole piece of the NCA positive electrode were prepared into a soft pack battery, with each unit designed as 42 Ah, through 18 processes including stacking, pre-welding, welding, loading in can, liquid-injecting, packaging, shelving, forming, second packaging, cutting-folding-ironing, capacity grading, and aging. The battery was tested on its first efficiency and cycle.

The battery prepared in Example 4 of the present disclosure has a first efficiency of 85.7%, and the capacity retention rate of the battery after 100 cycles is 90.7%.

Example 5

By mixing raw materials, stirring, coating, roller pressing, baking, and die cutting, a ribbon-shaped pole piece of a sulfur-carbon composite positive electrode was obtained.

Using the apparatus shown in FIG. 1b, the ribbon-shaped pole piece of the sulfur-carbon composite positive electrode and a pure metallic lithium ribbon covered with copper were roller pressed to realize a physical adhesion contact, and maintained at a temperature of 55° C. for 8 h in an atmosphere box with a vacuum degree of −70 KPa, stripped, and wound up, to obtain a positive electrode pole piece having high cycle efficiency.

The positive electrode pole piece having high cycle efficiency described above and a pole piece of a graphite negative electrode were prepared into a soft pack battery, with each unit designed as 2 Ah, through 18 processes including stacking, pre-welding, welding, loading in can, liquid-injecting, packaging, shelving, forming, second packaging, cutting-folding-ironing, capacity grading, and aging. The battery was tested on its first efficiency and cycle.

The battery prepared in Example 5 of the present disclosure has a first efficiency of 93.5%, and the capacity retention rate of the battery after 100 cycles is 96.1%.

Example 6

By mixing raw materials, stirring, coating, roller pressing, baking, and die cutting, a ribbon-shaped pole piece of a sulfur-carbon composite positive electrode was obtained.

Using the apparatus shown in FIG. 1b, the ribbon-shaped pole piece of the sulfur-carbon composite positive electrode and a composite ribbon of a stainless steel ribbon and metallic lithium were roller pressed to realize a physical adhesion contact, and maintained at a temperature of 0° C. for 8 h in an atmosphere box having a vacuum degree of −95 KPa with fluorine gas and carbon dioxide atmosphere introduced at an atmosphere pressure of 1:1, stripped, and wound up, to obtain a positive electrode pole piece having high cycle efficiency.

The positive electrode pole piece having high cycle efficiency described above and a pole piece of a graphite negative electrode were prepared into a soft pack battery, with each unit designed as 2 Ah, through 18 processes including stacking, pre-welding, welding, loading in can, liquid-injecting, packaging, shelving, forming, second packaging, cutting-folding-ironing, capacity grading, and aging. The battery was tested on its first efficiency and cycle.

The battery prepared in Example 6 of the present disclosure has a first efficiency of 96.5%, and the capacity retention rate of the battery after 100 cycles is 98.3%.

As known from the examples above, the present disclosure provides a method for manufacturing an electrode having high cycle efficiency, comprising the following steps: roller pressing, flat pressing, gas pressing or liquid pressing a metal source and an electrode of a metal to be supplemented, to realize a physical adhesion contact, and performing temperature control treatment under a vacuum or an inert atmosphere and then stripping the metal source, to obtain an electrode having high cycle efficiency; wherein the electrode of a metal to be supplemented is selected from a negative electrode capable of transporting metal or a positive electrode capable of transporting metal; and the metal source is a lithium source or a sodium source. The method provided by the present disclosure can obtain an electrode having high cycle efficiency only by subjecting the metal source and the electrode to be supplemented to physical adhesion contact, and then performing a temperature control treatment in a vacuum or an inert atmosphere for a certain duration. This method is simple. In addition, the electrode of a metal to be supplemented has both electronic conductivity and ion conductivity. Therefore, the metal source will undergo a metal embedding process to the electrode of a metal to be supplemented; and a metal diffusion process also occurs during the physical adhesion contact, so that the electrode has a higher first cycle efficiency, and a better cycle performance. The full battery produced by using the electrode manufactured by the method provided by the present disclosure has higher first cycle efficiency and higher capacity retention rate. The experimental results have shown that the battery manufactured by using the preparation method provided by the present disclosure has a first cycle efficiency of 85.7-96.5%, and the capacity retention rate of the battery after 100 cycles is 90.7-98.3%.

The above description is only the preferred embodiments of the present disclosure. It should be noted that for those skilled in the art, various improvements and modifications may be made without departing from the principle of the present disclosure, and these improvements and modifications should fall within the scope of protection of the present disclosure.

The invention claimed is:

1. A system for manufacturing an electrode having high cycle efficiency, comprising:
   an electrode treatment unit;
   a temperature control treatment device in serial connection with the electrode treatment unit, comprising a temperature control vacuum treatment device or a temperature control inert treatment device; and
   a stripping unit in serial connection with the temperature control treatment device;
   wherein the electrode is an electrode to be supplemented with metal;
   wherein the electrode treatment unit comprises a first metal source-unwinding shaft, for unwinding the first metal source; an electrode-unwinding shaft in parallel connection with the first metal source-unwinding shaft, for unwinding the electrode; and a press roller device in serial connection with the first metal source-unwinding shaft and the electrode-unwinding shaft, for press rolling the first metal source and the electrode into a composite electrode;
   the press roller device is configured to allow physically adhesive contact of the electrode with the first metal source in the composite electrode, so that the electrode is supplemented with the metal from the first metal source;
   the stripping unit is configured to peel off the first metal source that has been rolled by the press roller device from the composite electrode;
   the first metal source is a ribbon-shaped lithium source or a ribbon-shaped sodium source.

2. The system according to claim 1, wherein the temperature control vacuum treatment device is a vacuum oven or a vacuum bag.

3. The system according to claim 1, wherein an atmosphere inside the temperature control inert treatment device is a $CO_2$ atmosphere or an argon gas atmosphere.

4. The system according to claim 1, further comprising:
   an atmosphere box inside which a vacuum atmosphere or an inert atmosphere or a protective atmosphere or a mixed atmosphere of an inert atmosphere-a protective atmosphere is present;
   the electrode treatment unit is arranged inside the atmosphere box.

5. The system according to claim 1, further comprising a second metal source-unwinding shaft in parallel connection with the first metal source-unwinding shaft and the electrode-unwinding shaft, for unwinding a second metal source, wherein
   the first metal source-unwinding shaft and the second metal source-unwinding shaft are respectively located at an upper side and a lower side of the electrode-unwinding shaft; and
   the second metal source is a ribbon-shaped lithium source or a ribbon-shaped sodium source.

6. The system according to claim 5, wherein the electrode to be supplemented with metal is selected from graphite negative electrode, hard carbon negative electrode, soft carbon negative electrode, mesophase carbon microsphere negative electrode, silicon-carbon negative electrode, silicon-oxygen-carbon negative electrode, silicon negative electrode, silicon-oxygen negative electrode, lithium titanate negative electrode, transition metal oxide negative electrode or sulfur-based positive electrode; or
   wherein the stripping unit is a guide roller shaft; or
   wherein the system further comprises a winding unit in serial connection with the stripping unit, which is configurated to wind up the first metal source and/or the second source and the electrode after processed by the stripping unit.

7. A method for manufacturing an electrode having high cycle efficiency by using the system according to claim 1, comprising the following steps:
   roller pressing, flat pressing, gas pressing or liquid pressing a metal source and an electrode to be supplemented with metal, to form a composite electrode of the metal source and the electrode that are physically bonded; and
   subjecting the composite electrode to a temperature control treatment under a vacuum or an inert atmosphere and then stripping the metal source, to obtain an electrode having high cycle efficiency;
   wherein the electrode to be supplemented with metal is selected from a negative electrode capable of transporting metal or a positive electrode capable of transporting metal, and
   the metal source is a lithium source or a sodium source.

8. The method according to claim 7, wherein the electrode to be supplemented with metal is selected from graphite negative electrode, hard carbon negative electrode, soft carbon negative electrode, mesophase carbon microsphere negative electrode, silicon-carbon negative electrode, silicon-oxygen-carbon negative electrode, silicon negative electrode, silicon-oxygen negative electrode, lithium titanate negative electrode, transition metal oxide negative electrode or sulfur-based positive electrode; or
   wherein the lithium source is pure metallic lithium, lithium alloy or a lithium composite; and the sodium source is pure metallic sodium, sodium alloy or a sodium composite; or
   wherein the temperature control treatment is performed at a temperature of 0-150° C. for a duration of 0.1-168 h; or
   wherein the vacuum has a vacuum degree of −10 KPa to −99 KPa; or
   wherein the inert atmosphere is a carbon dioxide atmosphere or an argon atmosphere; or
   or wherein the metal source and the electrode to be supplemented with metal is roller pressed, flat pressed, gas pressed or liquid pressed under a vacuum or an inert atmosphere or a protective atmosphere or a mixed atmosphere of an inert atmosphere-a protective atmosphere.

9. The system according to claim 4, further comprising an a second metal source-unwinding shaft in parallel connection with the first metal source-unwinding shaft and the electrode-unwinding shaft, for unwinding a second metal source, wherein
the first metal source-unwinding shaft and the second metal source-unwinding shaft are respectively located at an upper side and a lower side of the electrode-unwinding shaft;
the second metal source is a ribbon-shaped lithium source or a ribbon-shaped sodium source.

10. A method for manufacturing an electrode having high cycle efficiency by using the system according to claim 4, comprising the following steps:
roller pressing, flat pressing, gas pressing or liquid pressing a metal source and an electrode to be supplemented with metal, to form a composite electrode of the metal source and the electrode that are physically bonded; and
subjecting a temperature control treatment under a vacuum or an inert atmosphere and then stripping the metal source, to obtain an electrode having high cycle efficiency;
wherein the supplemented electrode to be supplemented with metal is selected from a negative electrode capable of transporting metal or a positive electrode capable of transporting metal, and
the metal source is a lithium source or a sodium source.

11. The method according to claim 10, wherein the electrode to be supplemented with metal is selected from graphite negative electrode, hard carbon negative electrode, soft carbon negative electrode, mesophase carbon microsphere negative electrode, silicon-carbon negative electrode, silicon-oxygen-carbon negative electrode, silicon negative electrode, silicon-oxygen negative electrode, lithium titanate negative electrode, transition metal oxide negative electrode or sulfur-based positive electrode; or
wherein the lithium source is pure metallic lithium, lithium alloy or a lithium composite; and the sodium source is pure metallic sodium, sodium alloy or a sodium composite; or
wherein the temperature control treatment is performed at a temperature of 0-150° C. for a duration of 0.1-168 h; or
wherein the vacuum has a vacuum degree of −10 KPa to −99 KPa; or
wherein the inert atmosphere is a carbon dioxide atmosphere or an argon atmosphere; or
or
wherein the metal source and the electrode to be supplemented with metal is roller pressed, flat pressed, gas pressed or liquid pressed under a vacuum or an inert atmosphere or a protective atmosphere or a mixed atmosphere of an inert atmosphere-a protective atmosphere.

* * * * *